United States Patent [19]

Murakami

[11] Patent Number: 5,253,257
[45] Date of Patent: Oct. 12, 1993

[54] RECORDING ERROR DETECTOR CIRCUIT AND RECORDING REPRODUCING APPARATUS

[75] Inventor: Yoshihiro Murakami, Kanagawa, Japan

[73] Assignee: Sony Corporation, Tokyo, Japan

[21] Appl. No.: 764,109

[22] Filed: Sep. 23, 1991

Related U.S. Application Data

[63] Continuation of Ser. No. 419,390, Oct. 10, 1989, abandoned.

[30] Foreign Application Priority Data

Oct. 17, 1988 [JP] Japan .................. 63-259597

[51] Int. Cl.⁵ .............................. G11B 20/18
[52] U.S. Cl. ........................ 371/40.1; 360/53; 371/68.1
[58] Field of Search ............ 371/5.1, 68.1, 40.1; 360/31, 53; 358/327, 10

[56] References Cited

U.S. PATENT DOCUMENTS 4,672,483  6/1987  Kawada .................. 360/51
4,907,181  3/1990  Hedtke et al. ........... 358/10 X
4,918,694  4/1990  Preissler ................. 371/68.1 X

OTHER PUBLICATIONS

Patent Abstracts of Japan, vol. 9, No. 113 (P-356) (1836) May 17, 1985 & JP-A-60 000 673 (Matsushita Denki Sangyo K.K.) Jan. 5, 1985, abstract.
Patent Abstracts of Japan, vol. 10, No. 341 (P-517) (2397) Nov. 18, 1986 & JP-A-61 142 568 (Pioneer Electronic Corp.) Jun. 30, 1986, abstract.
Patent Abstracts of Japan, vol. 10, No. 101 (P-477) (2158) Apr. 17, 1986 & JP-A-60 231 982 (Sony K.K.) Nov. 18, 1985, abstract.
SMPTE Journal, vol. 97, No. 3, Mar. 1988, US R. Brush: 'Design considerations for the D-2 NTSC composite DVTR'.

Primary Examiner—Stephen M. Baker
Attorney, Agent, or Firm—Lewis H. Eslinger; Jay H. Maioli

[57] ABSTRACT

Digital television signal on which an error correction code is aditionally employed is over recorded on a previous recorded tape portion without erasing the same and then reproduced. A reproduced and error corrected digital television signal is compared with the digital television signal so that an identity between both digital television signals is detected. In a case if the identity is not detected and error flag of the reproduced television signal is not detected, a signal indicating a record error is generated so that an operater can recognize an occurrence of the record error.

6 Claims, 3 Drawing Sheets

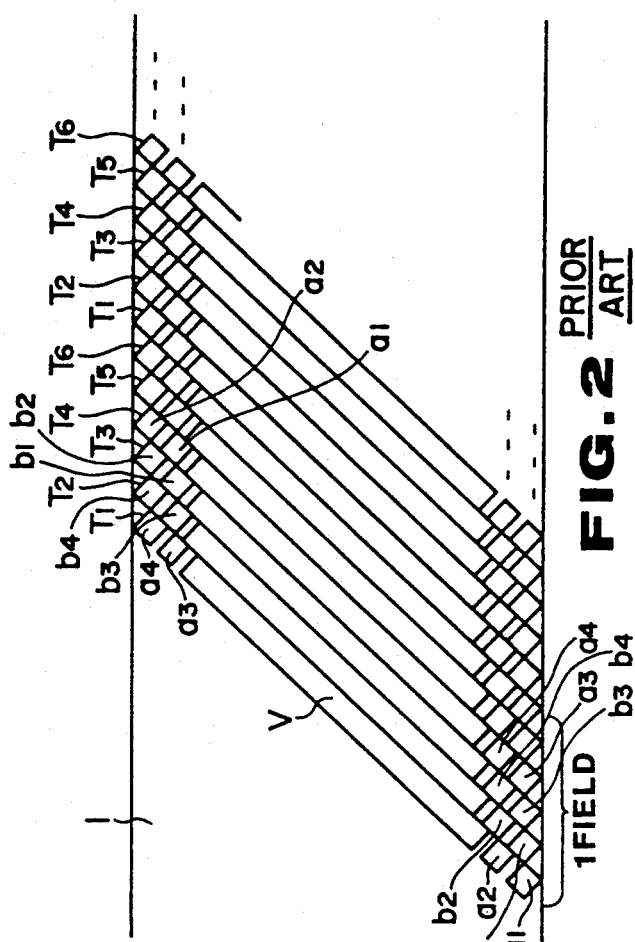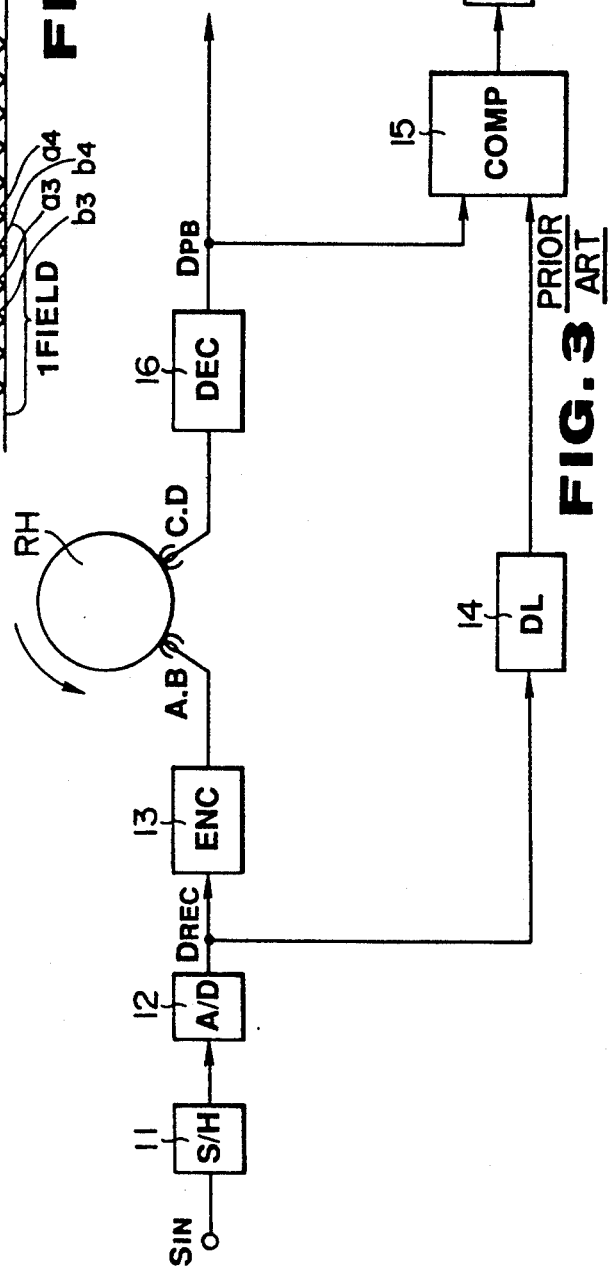

RECORDING ERROR DETECTOR CIRCUIT AND RECORDING REPRODUCING APPARATUS

This is a continuation of application Ser. No. 07/419,390, filed Oct. 10, 1989, now abandoned.

BACKGROUND OF THE INVENTION

1. Field of the Invention

This invention relates to a recording error detection circuit and a recording/reproducing apparatus for detecting recording errors based on the comparison of digital data recorded on a recording medium and digital data reproduced from the firstly started digital data. The present invention is applicable to a so-called D1 or D2 format digital video tape recorder adapted for recording and/or reproducing digital data.

2. Prior Art

In a so-called D1 or D2 format composite digital video tape recorder, it has been customary to record the digitized video data and audio data sequentially on recording tracks T inclined with respect to the longitudinal direction of a magnetic tape 1, as shown in FIG. 2, using a rotary magnetic head device RH such as shown in FIG. 1.

The rotary magnetic head device RH shown in FIG. 1 is provided with paired recording heads $A_1$, $B_1$; $A_2$, $B_2$ arranged at an interval of 180° from each other and paired reproducing heads $C_1$, $D_1$; $C_2$, $D_2$ arranged at an interval of 180° from each other and in a direction extending orthogonally to the recording heads $A_1$, $B_1$, $A_2$, $B_2$. Each of these pairs of recording heads $A_1$, $B_1$; $A_2$, $B_2$ and reproducing heads $C_1$, $D_1$; $C_2$, $D_2$ is arranged with a height difference equal to one track width. In the case of the NTSC system, for example, the rotary magnetic head device RH is driven at the rate of one and a half revolutions per field to record one-field video data on six tracks $T_1$ to $T_6$ on the magnetic tape 1, as shown in FIG. 2.

Meanwhile, video data V for each field are sequentially recorded at the central image region of each of the tracks $T_1$ to $T_6$ on the magnetic tape 1, while four-channel audio data $a_1$, $a_2$, $a_3$, $a_4$; $b_1$, $b_2$, $b_3$, $b_4$, compressed along the time axis, are recorded by duplicate recording on the inlet and outlet sides of each of the tracks $T_1$ to $T_6$.

In this type of the composite digital VTR, audio data of the same contents as the audio data recorded at the outlet sides of the tracks $T_1$ and $T_2$ are recorded as data $b_3$, $b_4$, $a_3$, $a_4$ at the inlet sides of the next adjacent tracks $T_3$ and $T_4$. Although not high in economic efficiency, such duplicate recording system, according to which the same audio data are recorded at two different locations on the tape, has an advantage that the probability of correct signal reproduction is doubled. Above all, in the format shown in FIG. 2, since the digital audio signals are recorded in the vicinity of both edges of the magnetic tape 1, the probability is high that data errors will be caused during reproduction. In order to prevent this, the duplicate recording system is adopted. Incidentally, it should be noted that, while the audio data $a_3$, $a_4$ recorded on the track $T_1$ are recorded by the recording head $A_1$ and the audio data $b_3$, $b_4$ recorded on the track $T_2$ are recorded by the recording head $B_1$, the audio data $b_3$, $b_4$ recorded on the track $T_3$ are recorded by the recording head $A_2$ and the audio data $a_3$, $a_4$ recorded on the track $T_2$ are recorded by the recording head $B_2$.

Meanwhile, in the above mentioned digital video tape recorder, the same tracks as those on which video data and audio data have been recorded by the recording heads $A_1$, $B_1$, $A_2$ and $B_2$ may be reproduced simultaneously by the reproducing heads $C_1$, $D_1$, $C_2$, $D_2$. Thus, in an arrangement of the recording/reproducing system shown for example in FIG. 3, there is added a so-called verifying function of checking the data recorded by the recording heads $A_1$, $B_1$, $A_2$, $B_2$ against the data reproduced by the reproducing head $C_1$, $D_1$, $C_2$, $D_2$, for ascertaining whether or not recording has been made normally.

That is, in the conventional recording/reproducing system shown in FIG. 3, analog input signals $S_{IN}$ are introduced via a sample-and-hold (S/H) circuit 11 to an analog to digital (A/D) converter 12. These analog input signals $S_{IN}$ are supplied to an encoder 13 in the form of record data $D_{RED}$ digitized by the A/D converter 12, which record data $D_{REC}$ are simultaneously supplied via delay circuit 14 to a data comparator 15. The record data $D_{REC}$ are subjected at the encoder 13 to predetermined data processing, such as data shuffling or addition of outer or inner codes for error correction, before being recorded by the recording heads $A_1$, $B_1$, $A_2$ and $B_2$ of the rotary magnetic head device RH on the tracks $T_1$ to $T_6$ on the magnetic type 1.

In the above mentioned recording/reproducing system, the reproducing operation for the tracks $T_1$ to $T_6$ is performed simultaneously with the above mentioned recording operation, and the playback output to be reproduced by the reproducing heads $C_1$, $D_1$, $C_2$ and $D_2$ is subjected to a predetermined decoding operation by a decoder 16 functionally associated with the encoder 13. In this manner, the playback data $D_{PB}$ corresponding to the data recorded on the tracks $T_1$ to $T_6$ are obtained and supplied to the data comparator 15.

The delay circuit 14 affords a delay to the record data $D_{REC}$ which delay is equal to the time consumed in obtaining the playback data $D_{PB}$ corresponding to the record data $D_{REC}$ recorded on the tracks $T_1$ to $T_6$. A more specific description of affording such delay to the record data is not given herein since it is the subject-matter of our copending Japanese Patent Application No. 38494/1988.

The record data $D_{REC}$ supplied via the delay circuit 14 and the playback data are compared with each other at the data comparator 15 to detect non-coincidence and hence the occurrence of the record errors. The record error detection outputs from the data comparator 15 are counted by a counter 17 and an alarm is issued when the number of times of occurrence of the record errors exceeds a predetermined value.

Meanwhile, in the above mentioned conventional recording/reproducing system, shown in FIG. 3, wherein the non-coincidence between the record data $D_{REC}$ supplied via delay circuit 14 and the playback data $D_{PB}$ is detected by the data comparator 15 to detect the record errors, the record error detection outputs from the data comparator 15 are counted by the counter 17 and the alarm is issued when the number of times of occurrence of the record errors exceeds a predetermined value, there is a drawback that, when new data are recorded in superposition by an insert editing operation on a pre-recorded magnetic tape 1 and if there be any unerased data portion in a part of the superposed recorded portion, such unerased data portion being detected as the recording error by the data comparator 15, no alarm will be issued when the number of times of occurrence of the record errors is less than the predetermined value, such previously recorded but unerased data portion being then reproduced with the newly recorded data.

OBJECTS AND SUMMARY OF THE INVENTION

It is an object of the present invention to provide a digital video tape recorder for recording and/or reproducing digital data wherein data errors caused by the failure in erasing the previously recorded data on the pre-recorded magnetic tape at the time of the so-called insert edition may be prevented from being recorded.

It is another object of the present invention to provide a digital video tape recorder for recording and/or reproducing $D_1$ or $D_2$ format digital data in which digital audio data, for example, are dually recorded on the recording tracks, wherein data errors caused by the failure in erasing the previously recorded data at the time of the so-called insert editing may be detected easily and reliably.

It is a further object of the present invention to provide an error detection circuit wherein data errors caused by failure in erasing the previously recorded data on the pre-recorded magnetic tape may be detected reliably.

It is still another object of the present invention to provide a recording and/or reproducing apparatus for television signals wherein data errors caused by the failure in erasing the previously recorded data may be prevented from being recorded for reliably performing so-called insert editing.

These and other objects of the present invention will become more apparent from the following description and the appended claims.

BRIEF DESCRIPTION OF THE DRAWINGS

FIG. 1 is a diagrammatic view showing an example of a rotary magnetic head device employed in a digital video tape recorder.

FIG. 2 is a diagrammatic view showing track patterns in a digital video tape recorder employing the rotary magnetic head device shown in FIG. 1.

FIG. 3 is a block diagram showing the construction of the recording/reproducing system of a conventional digital video tape recorder having a verifying function.

DESCRIPTION OF THE PREFERRED EMBODIMENT

An illustrative embodiment of the present invention will be explained in more detail hereinbelow.

Figure 4:
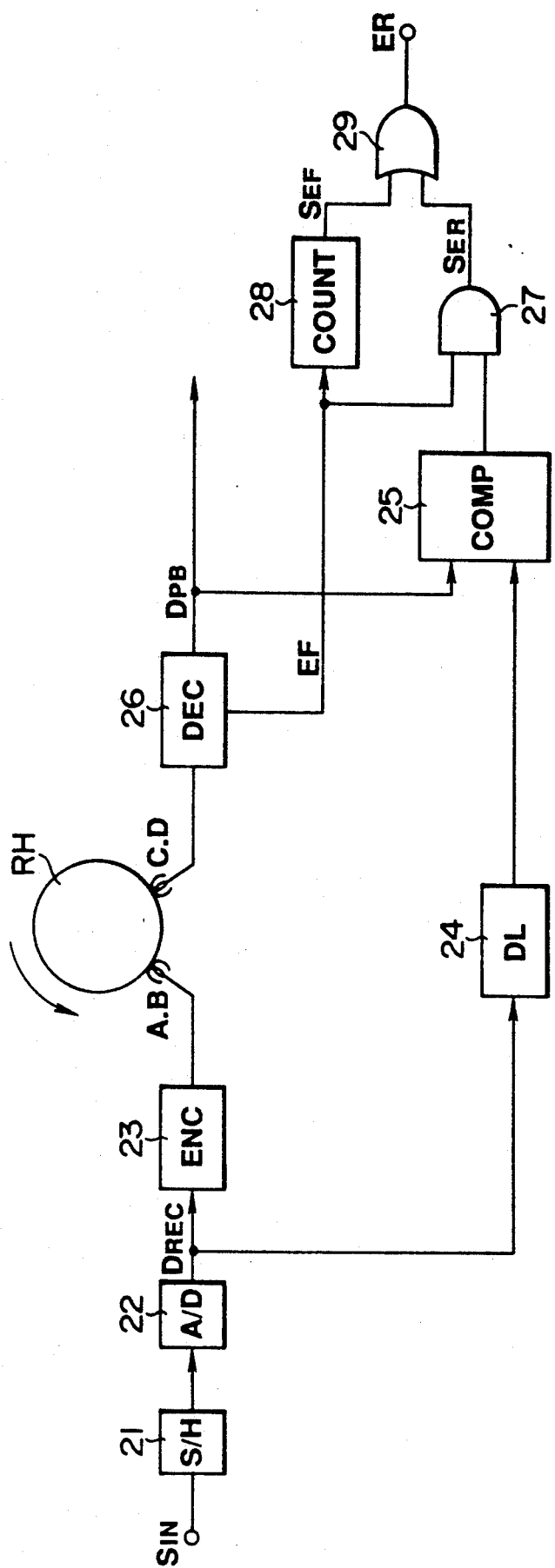
FIG. 4 is a block diagram showing the construction of the recording/reproducing system of a digital video tape recorder having an error detection circuit according to the present invention.
Figure 5:
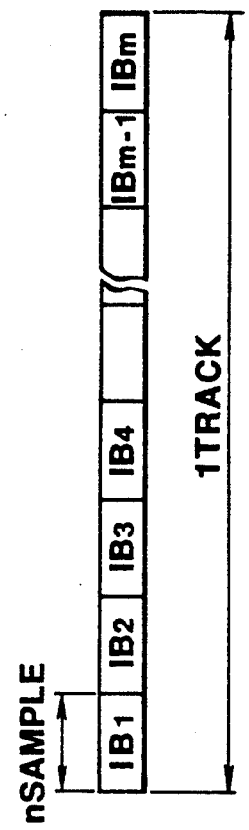
FIG. 5 is a diagrammatic view showing an example of a recording format employed in the recording/reproducing system shown in FIG. 4.

The recording/reproducing system of a digital video tape recorder embodying the present invention is illustrated in FIG. 4.

This digital video tape recorder functions to record and/or reproduce television signals via a magnetic tape 1 in accordance with the format shown in FIG. 2 with the use of the rotary magnetic head device RH shown in FIG. 1.

In the recording/reproducing system of the digital video tape recorder shown in FIG. 4, the analog input signals $S_{IN}$ are supplied via S/H circuit 21 to an A/D converter 22. The record data $D_{REC}$, that are the analog input signals $S_{IN}$ digitized by the A/D converter 22, are supplied, as the digital data to be recorded, to an encoder 23, while being simultaneously supplied via delay circuit 24 to a data comparator 25. The record data $D_{REC}$ are subjected at the encoder 23 to a predetermined data processing inclusive of data shuffling or addition of error correction codes, before being recorded on the tracks $T_1$ to $T_6$ on the magnetic tape 1 by the recording heads $A_1$, $B_1$, $A_2$, $B_2$ of the rotary magnetic head device RH, shown in FIG. 1, in accordance with the format shown in FIG. 2.

The recording/reproducing system functions to reproduce data from the tracks $T_1$ to $T_6$, simultaneously with the recording operation, the reproduced outputs from the reproducing heads $C_1$, $D_1$, $C_2$, $D_2$ being supplied to a decoder 26.

The decoder 26 functions to perform predetermined data processing of the playback data, inclusive of deshuffling and error correction based on the error correction codes, in operative association with the encoder 23. In this manner, playback data $D_{PB}$ corresponding to the record data $D_{REC}$ recorded on the tracks $T_1$ to $T_6$ are obtained and are supplied to the data comparator 25, and error flags EF indicating data errors in the error-corrected play back data $D_{PB}$ are obtained and are supplied to an AND gate 27.

It will be noted that the delay circuit 24 affords a delay to the record data $D_{REC}$ which delay corresponds to the time consumed in obtaining playback data $D_{PB}$ corresponding to the record data recorded on the tracks $T_1$ to $T_6$. In this manner, the record data $D_{REC}$ are supplied to the data comparator 25 via delay circuit 24 at a timing coincident with the playback data $D_{PB}$ from the decoder 26.

In the data comparator 25, the record data $D_{REC}$ supplied via the delay circuit 24 and the playback data $D_{PB}$ from the decoder 26 are compared to each other, and the non-coincidence detection output is supplied to the AND gate 27.

The AND gate 27 outputs a logical product output of the non-coincidence detection output from the data comparator 25 and the error flag EF, as a record error signal $S_{ER}$. This record error signal $S_{ER}$ is outputted when the non-coincidence detection output is issued by the data comparator 25 thus indicating a recording error and the error-corrected playback data $D_{PB}$ are reproduced in an error-free state by the decoder 26; that is, unerased data portions produced as a result of the insert editing are reproduced normally by the decoder 26.

In the present recording/reproducing system, the number of error flags EF of the playback data $D_{PB}$ obtained by the decoder 26 is counted by a counter 28. Thus, when the number of times of data error occurrence as indicated by the error flags EF exceeds a predetermined value, the counter 28 issues a record error signal $S_{EF}$ indicating the state of recording errors.

The record error signals $S_{ER}$, obtained by the AND gate 27, and the record error signal $S_{EF}$, obtained by the counter 28, are supplied to alarm means, not shown, via an OR gate 29, to issue an alarm that the recording error has been produced.

In the above described recording/reproducing system, since the recording errors are detected by using error-corrected playback data $D_{PB}$ reproduced by the decoder 26 and the error flags EF for the data $D_{PB}$, it is unnecessary to compare the totality of both the record data $D_{REC}$ and the playback data $D_{PB}$ by the data comparator 25, but sufficient to compare these data by units of error correction code blocks in which the above error flags EF have been produced. That is, when the error correction codes are formed by a n number of samples, unerased data may be detected by simply detecting a 1/n number of the totality of samples. For example, in the case of a recording format in which one-track data are constituted by a number m of inner code blocks $IB_1, IB_2, \ldots, IBm$, each inner code block being constituted by a number n of samples, it is sufficient to compare the number m of samples per track, thus enabling a reduction in the scale or size of the delay circuit elements.

In the above described recording/reproducing system, the error correction codes are affixed to the input data in the encoder 23 as recording processing means to provide the record data $D_{REC}$ recorded on the magnetic tape 1, while the recorded record data $D_{REC}$ are reproduced from the magnetic tape 1 and subjected at the decoder 26 as reproducing processing means to error correction based on the error correction codes. On the other hand, possible non-coincidence between the error-corrected playback data $D_{PB}$ from the decoder 26 and the record data $D_{REC}$ supplied via the delay circuit 24 and that are to be recorded on the magnetic tape 1 is detected. The AND gate 27 as the record error signal output means outputs a recording error signal, when a non-coincidence detection output is obtained by the data comparator 25 with respect to the error-free playback data $D_{PB}$ reproduced from the decoder 26, on the basis of the error flag EF indicating the data errors in the error-corrected playback data $D_{PB}$.

This recording error signal is outputted when the non-coincidence detection output is issued by the data comparator 25 thus indicating the recording error state and the error-corrected playback data $D_{PB}$ are reproduced in an error-free state by the decoder 26, that is, when the data previously recorded and remaining unerased in the course of the insert editing operation may be reproduced normally by the decoder 26. Thus the previously recorded and unerased data portions may be reliably detected by this recording error signal.

It is therefore possible with the above described digital video tape recorder provided with the recording/reproducing system to prevent recording of data errors caused by the failure in erasing the previously recorded data on the pre-recorded magnetic tape in the course of the so called insert editing.

According to the present invention, as described hereinabove, those signals that are used for recording are used for comparison. Although the teaching of the present invention may be applied to error detection of video and audio data, it is also possible, in the case of the above described duplex recording system, that is, in the format in which the same audio data are recorded at different locations on the tape, to detect unerased audio signals with the use only of the playback audio data.

Figure 6:
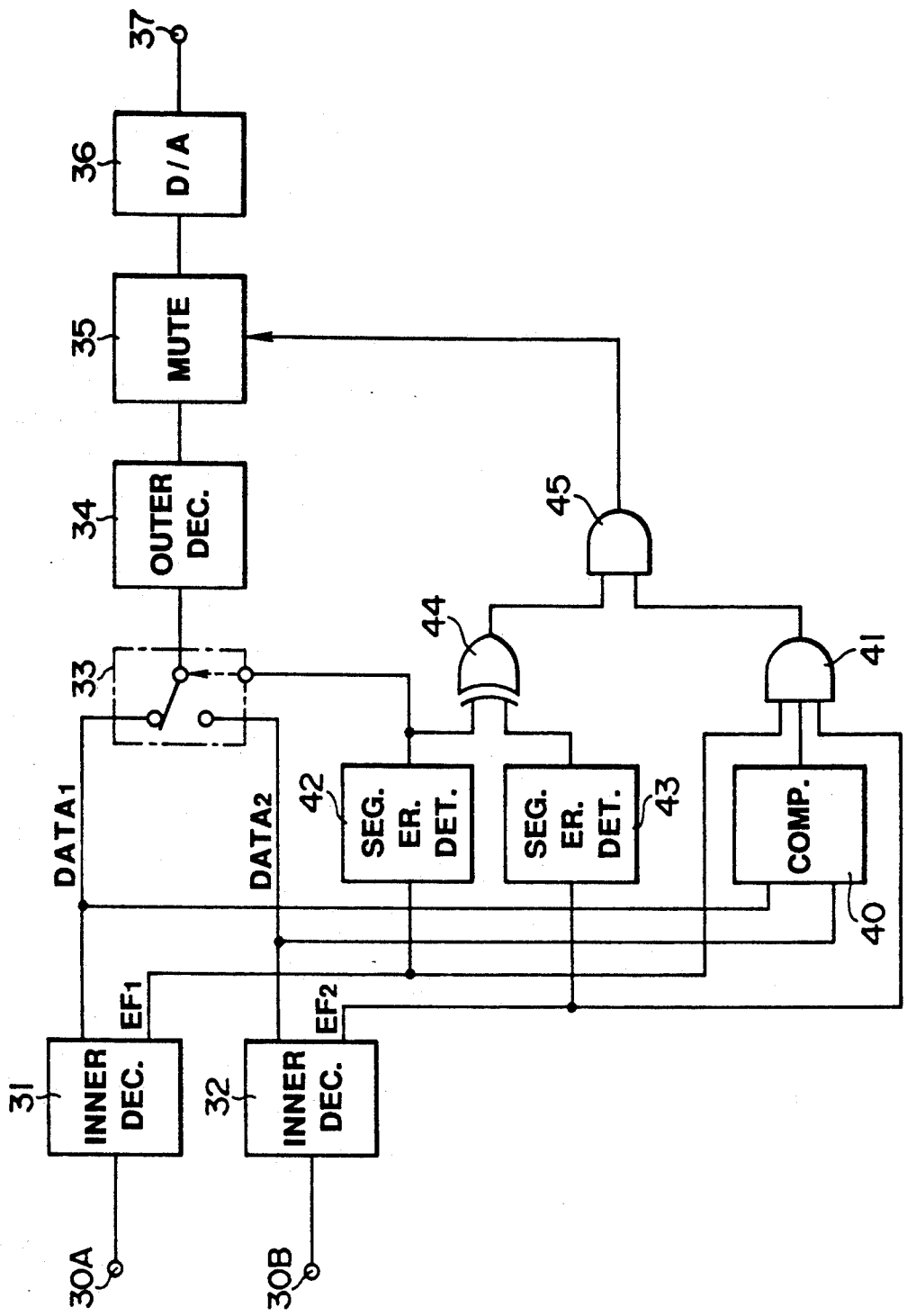
FIG. 6 is a block diagram showing a modified embodiment of the error detection circuit according to the present invention.

An embodiment of an error detection circuit in which the above described duplex recording system is effectively utilized for error detection is now explained in detail by referring to FIG. 6.

In the error detection circuit shown in FIG. 6, the present invention is applied to the playback system for audio signals in a digital tape recorder having the track format as shown in FIG. 2 and including the rotary magnetic head device RH shown in FIG. 1.

In the error detection circuit, shown in FIG. 6, among the playback outputs reproduced from the tracks $T_1$ to $T_6$ on the magnetic tape 1 having the track format shown in FIG. 2, the playback outputs from the audio region at the inlet side to the video region, referred to hereinafter as the first audio playback outputs, such as the audio data $b_3, b_4, a_3, a_4$ reproduced from the audio region at the inlet side to the tracks $T_3$ and $T_4$, are supplied via first input terminal 30A to a first correction decoding circuit 31. On the other hand, the playback outputs from the audio region at the outlet side of the video region, referred to hereinafter as the second audio playback outputs, for example, audio data $a_3, a_4, b_3, b_4$ reproduced from the audio region at the outlet sides of the tracks $T_1$ and $T_2$, are supplied to a second correction decoding circuit 32 via second input terminal 30B.

The correction decoding circuits 31, 32 function to perform correction decoding, such as error correction or decoding, by units of data blocks of the inner codes, and to output correction decoded audio playback data DATA 1 and DATA 2 simultaneously with error flags EF1 and EF2. The correction decoded audio playback data DATA1 and DATA2, obtained by the correction decoding circuits 31, 32 are supplied to a data comparator 40, while being supplied to a third correction decoding circuit 34 via a selection switch 33. The error flag EF1, produced by the first correction decoding circuit 31, indicates the error-free state of the correction decoded audio playback data DATA1 by the logically high level "H". This error flag $EF_1$ is supplied to both a first AND gate 41 and a first burst error detection circuit 42. The error flag $EF_2$ obtained by the second correction decoding circuit 32 indicates the error-free state of the correction decoded audio playback data DATA2 by the logically high level "H". This error flag $EF_2$ is supplied to both the first AND gate 41 and a second burst error detection circuit 43.

The third correction decoding circuit 34 functions to perform correction decoding, such as error correction by outer codes or decoding, of the audio playback data supplied thereto via selection switch 33. The correction decoded audio playback data from the third correction decoding circuit 34 are supplied via a muting circuit 35 to a digital to analog (D/A) converter 36 and thereby converted into analog signals before being outputted as the playback audio signals at a signal output terminal 37.

The data comparator 40 compares the correction decoded audio playback data DATA1 and DATA2 from the correction decoding circuits 31 and 32 to issue a non-coincidence detection output indicating the state of non-coincidence by the logically high (H) level to the first AND gate 41. This first AND gate 41 is opened when both the error flags $EF_1$ and $EF_2$ are at the logically high (H) level, that is, when the correction decoded audio playback data DATA1, DATA2 from the correction decoding circuits 31, 32 are in the error-free state, to output the non-coincidence detection output of the data comparator 40 as the error detection output.

At this time, when the data remaining on the pre-recorded magnetic tape 1 due to non-erasure are reproduced normally by one of the correction decoding circuits 31, 32, the correction decoded audio playback data DATA1, DATA2, obtained at the correction decoding circuits 31, 32 are both error-free and non-coincident with each other, so that the error detection output indicating the data error due to non-erasure may be obtained at the first AND gate 41.

Meanwhile, the probability that the data remaining on the pre-recorded magnetic tape 1 due to non-erasure of the previously recorded data are reproduced normally and as the identical signal is so low that the data errors due to such non-erasure may be sufficiently detected by detecting that the correction decoded audio playback data DATA1, DATA2 obtained by the correction decoding circuits 31, 32 are both error-free and are inconsistent with each other.

In the above described error detection circuit, the error detection output produced by this first AND gate 41 is supplied as the control signal to the muting circuit 35 via second AND gate 45 for muting the playback audio signals at the time of occurrence of data errors due to non-erasure.

In will be noted that, in case of occurrence of data errors due to non-erasure, burst errors are necessarily produced before and after such data errors. Thus, in the present illustrative error detection circuit, the audio playback data DATA1, DATA2 are checked for the occurrence of the burst errors on the segment-by-segment basis. The detection output by the first burst error detection circuit 42 is supplied as the selection control signal to a control input end of the selection switch 33 to select the audio playback data free of the burst errors by the selection switch 33. In addition, the detection outputs from the burst error detection circuits 42, 43 are supplied via an exclusive OR circuit 44 to the second AND gate 45 as a gate control signal for opening the third AND gate 45 by the output of the exclusive OR circuit 44 only on occurrence of the burst errors in one of the audio playback data DATA1 and DATA2 for applying muting to the muting circuit 35 by the error detection output.

In the illustrative error detection circuit, as described hereinabove, each playback output of the record data dually recorded on the record tracks of the magnetic tape 1 with addition of the error correction codes is subjected to correction decoding by the inner codes at the correction decoding circuits 31, 32. The data comparator 40, detecting non-coincidence by comparing the correction-decoded playback outputs of the correction decoding circuits 31, 32, outputs an error detection signal when both sets of playback data are reproduced in an error-free state as the result of the correction decoding at the correction decoding circuits 31, 32 and are non-coincident with each other, that is, when those portions of the pre-recorded data that remain unerased in the course of the insert editing operation are reproduced normally by the correction decoding means.

Thus, in a digital video tape recorder for recording and/or reproducing so-called D1 or D2 format digital data in which digital audio data are dually recorded on the recording tracks, data errors caused by the failure in erasing previously recorded data on a magnetic tape in the course of the so-called insert editing may be detected easily and reliably with the use of the above described error detection circuit.

What is claimed is:

1. An error detection circuit for a digital signal recording and reproducing apparatus wherein a digital signal having an error correction code is recorded on a record medium and reproduced therefrom and an error correction is effected on the basis of the error correction code so that an erroneous reproduced digital signal can be identified by an error flag signal and corrected, said circuit comprising:
   checking means responsive to a digital signal prior to being recorded and the same digital signal as reproduced and corrected in order to determine whether or not there is an identity therebetween,
   means for generating a first recording error signal when neither the identity nor the error flag signal is detected,
   means for counting the error flag signals and generating a second recording error signal when a predetermined number of error flag signals is counted,
   an error monitoring device, and
   means for providing said first and second recording error signals to the error monitoring device.

2. The error detection circuit according to claim 1 in which said digital signal comprises a video signal and an audio signal.

3. The error detection circuit according to claim 2 in which said checking means comprises a comparator.

4. The error detection circuit according to claim 3 in which said generating and detecting means comprises an AND gate circuit.

5. The error detection circuit according to claim 4 in which said selectively providing means comprises an OR gate circuit.

6. A recording error detection circuit for a digital recording/reproducing apparatus in which a new digital signal is recorded by overwriting on a first location on a magnetic tape and another signal which is the same as said new digital signal is recorded at a different location on said tape, said circuit comprising:
   a first decoder receiving said new digital signal reproduced from said first location to produce a first decoded digital signal and a first error flag,
   a second decoder receiving said new digital signal reproduced from said different location to produce a second decoded digital signal and a second error flag,
   means for comparing said first and second decoded signals,
   means receiving said first and second error flags and an output signal of said comparing means and issuing a signal indicating the occurrence of recording errors when said first and second error flags indicate no errors and the output of said comparing means indicates non-coincidence,
   first and second first error detection means for detecting burst errors in said first and second decoded digital signals, and
   switching means supplied with said first and second decoded digital signals and selecting one of said first and second decoded digital signals under control of an output signal of at least one of said first and second burst error detection means.

* * * * *